United States Patent [19]

Thibault et al.

[11] Patent Number: 5,020,778

[45] Date of Patent: Jun. 4, 1991

[54] APPARATUS FOR STIRRING MOLTEN METAL

[75] Inventors: Marc-Andre Thibault; Marc Auger, both of Jonquiere; Bruno Gariepy, Chicoutimi; Andre Gendron, Jonquiere, all of Canada

[73] Assignee: Alcan International Limited, Montreal, Canada

[21] Appl. No.: 351,024

[22] Filed: May 12, 1989

[30] Foreign Application Priority Data

May 20, 1988 [CA] Canada .................................. 567368

[51] Int. Cl.⁵ ............................................ F27D 23/04
[52] U.S. Cl. ........................................ 266/89; 266/91; 266/94; 266/208; 266/233
[58] Field of Search .................... 266/208, 233, 89, 91, 266/94

[56] References Cited

U.S. PATENT DOCUMENTS 4,008,884  2/1977  Fitzpatrick et al. ................ 266/233
4,463,935  8/1984  Yonekawa ........................... 266/233

Primary Examiner—Melvyn J. Andrews
Attorney, Agent, or Firm—Cooper & Dunham

[57] ABSTRACT

The invention provides a new stirring apparatus for stirring the liquid metal contents of a furnace, particularly the shallow furnaces used in the processing of aluminum and its alloys. The apparatus consists a reservoir separate from the furnace of relatively large horizontal cross-section and volume, into which a vaccuum draws metal from the furnace through a nozzle, the metal then being returned by gas pressure forcibly into the furnace through the nozzle in the form of a horizontally directed jet. The cycle is repeated at sufficiently close intervals to ensure that the furnace bath is quickly and effectively mixed. The nozzle directs the molten metal entering the reservoir tangentially to swirl the metal and reduce the accumulation of dross. The reservoir comprises a bottom static part including the nozzle and a readily removable top cover carrying heaters for heating the reservoir interior and the dross that deposits on the side wall to ease its removal. The cover also carries level control electrodes, an observation port, inlet ports, etc. A pressure disturbance monitor connected to the reservoir interior is used for lower level control by detecting undesired bubbling of the pressurizing gas into the metal, and can also be used to monitor the pressure reversals between vacuum and pressurization phases. The cycles of vaccuum and pressure are controlled in a manner that maximizes the quantity of metal entering the reservoir so as to obtain the maximum stirring effect.

29 Claims, 10 Drawing Sheets

APPARATUS FOR STIRRING MOLTEN METAL

FIELD OF THE INVENTION

The present invention relates to an improved apparatus for stirring molten metal, for example aluminum, in a furnace in which the metal is melted or alloyed.

REVIEW OF THE PRIOR ART

The desirability of rapid and effective stirring of the contents of a bath of molten metal is so manifest that considerable effort has been expended in devising new methods and apparatus for this purpose. Thus, it facilitates the initial melting of the metal, the melting of solid metal added to an existing melt, the incorporation of additives such as other metals for alloying and grain refining, or assists in maintaining the body of metal at a uniform temperature and composition with improved temperature control. It is also found in practice to result in substantial savings in the energy required to melt the metal and maintain it in that condition.

Effective stirring has become even more important with the development of various alloys, particularly alloys of aluminum, which must be stirred in order to homogenize the alloy composition and temperature before pouring. One system widely used in aluminum furnaces involves the use of a tool attached to the end of a boom that is in turn mounted on a lift truck; stirring is achieved by moving the tool back and forth in the melt. This system has the disadvantages of imparting mechanical shock to the refractory lining, and more importantly that the surface of the metal is agitated, increasing dross formation; in addition, during this operation the furnace doors must be open to admit the stirring tool, causing additional thermal losses.

Another method employed is to inject gas under pressure into the bath through one or more lances, but this also causes increased dross formation and erosion of the refractory lining. With the wide and shallow furnaces typically used for aluminum it is less efficient than mechanical stirring owing to the limited range of action of the lances, requiring the use of a number of lances, or for the lance or lances to be moved around the bath.

Two different types of electric systems have also been developed, namely electromagnetic stirrers and mechanical or electromagnetic immersion pumps. An electromagnetic stirrer comprises a large induction coil which is located beneath the furnace and generates an electromagnetic stirring force in the metal. Such stirrers can be applied to any type of furnace and, besides being efficient, have the advantage that there is no component in direct contact with the metal. They are however relatively costly and in 1988 an installation for a 60 ton furnace is quoted at between about U.S. $600,000 and U.S. $850,000 Canadian. Immersion pumps are compact units which are immersed in the metal in an access well, and therefore are mainly limited to furnaces with such a well. Although their first cost is much lower they require constant maintenance under the arduous conditions of operation immersed in the metal.

Another mechanical system that has been the subject of extensive development is generally called a jet pump and comprises a tube forming a tubular reservoir connected to the furnace into which a portion of the molten metal is drawn by a vacuum and then expelled back into the bath by gas pressure and/or gravity. With appropriate choice of parameters, such as nozzle diameter and initial metal velocity, the intermittent jets of moving metal entrain many times their own volume and can stir the whole furnace within minutes of the commencement of the operation.

For example, there is disclosed in U.S. Pat. No. 4,008,884 of Fitzpatrick et al., assigned to Alcan Research and Development Limited, such an intermittent jet stirring apparatus comprising a cast-iron pipe or tube which extends downwardly at an angle of about 40° to 50° to the vertical through one side wall of the melting furnace, the pipe terminating in a nozzle close to the furnace floor and aimed in a horizontal, longitudinal direction toward the other side wall. An air-operated ejector is connected to the top of the pipe and is actuated at regular intervals to produce a vacuum that draws molten metal into the pipe until it is above the level in the bath. When the liquid level reaches an upper limit the vacuum is replaced by air under pressure to expel the metal through the nozzle back into the bath in the form of a high speed jet. For a furnace of about 40–50 tons Fitzpatrick et al propose to use a tube of inside cross section about 738 sq. cm. (45 sq. ins.) and length 3 meters (9 feet), so that it receives and discharges about 90–115 kilos (200–250 pounds) of metal at each cycle, the metal exiting through a nozzle of diameter 3.8 cm (1.5 ins.) at velocities of about 32 kmph (20 mph). The suction part of the cycle takes about 6–7 seconds, while the pressure part takes only about 0.5–1 second, requiring air at a pressure in the range 1.4–2.8 Kgs/sq. cm. (20–60 p.s.i.).

Similar types of apparatus employing a side-entering upwardly-inclined tube are disclosed, for example, in U.S. Pat. Nos. 3,599,831; 4,235,626; 4,236,917; 4,355,789; 4,463,935; UK Patent Applications Publication Nos. 2,039,761A and 2,039,765A; and Japanese Patent Applications Nos. 1983-136982 and 1984-70200.

U.S. Pat. No. 3,424,186 discloses what it calls a circulating device consisting of a hollow chamber disposed in a side-well of a furnace and containing a vertical wall dividing the interior of the chamber in two parts. A vacuum device at the top of the chamber draws molten metal simultaneously from the furnace and the well through respective ports until the metal flows over the top of the wall. The port to the furnace is much larger than that to the well, so that it flows in faster, but the part of the chamber on the side of the wall supplied from the well is much larger, so that there is a resultant transfer of metal from the furnace side of the wall to the well side. The metal flows from the well back into the furnace through the usual port connecting them.

Another type of stirrer disclosed, again for example, in U.S. Pat. Nos. 4,427,44 and 4,452,634 comprises a vertically-extending pipe disposed above the bath with its lower end extending into the metal, the metal being drawn into the pipe by a vacuum and allowed to return under gravity.

These prior apparatuses may be efficient in providing stirring, but involve a number of problems in their operation. For example, the lower parts of the tubes employed are in direct contact with the molten metal, and consequently undergo very fast erosion. The middle part is above the molten metal but may still be inside the furnace where it is subjected to the high temperature of the burners (e.g. 1000°–1100° C.), which again causes the material (e.g. cast iron) to deteriorate and make the system inoperative or costly to operate. Moreover, with a relatively small diameter pipe it is difficult to provide a thick insulating layer and, unless the tube is provided with internal heaters, for example embedded in the wall, as disclosed in U.S. Pat. No. 4,463,935, there is a high rate of deposition of frozen metal and oxides on the wall interior in the form of a dross ring or collar. In extreme cases there is the possibility that the metal which enters the tube can solidify, or at least become very viscous, if its temperature falls to close to the melting point. Even if heaters are provided, with the inevitable erosion of the pipe wall, and infiltration of the molten metal through cracks in the lining, the heaters can quickly become damaged, and they are of course much more difficult and expensive to replace than a plain pipe.

It is also found with these systems extremely difficult to control the maximum and minimum levels of the metal within the tubes. It is in practice impossible to prevent the formation of the "dross" ring or collar, especially with some high magnesium content aluminum alloys that react very rapidly with the oxygen contained in the stirrer internal chamber. In U.S. Pat. No. 4,463,935 it is proposed to use the combustion gas from the furnace as the propulsion gas in order to minimize the metal oxidation within the tube, since such gas has a lower oxygen content; the gas does however have a high proportion of $H_2O$ which will readily oxidize the molten metal at these temperatures.

Owing to the small diameter of the tubes a quite small dross ring is big enough to contact and short circuit the electrodes used for upper level control and will then render the control inoperative. With an inoperative upper level control the metal can easily fill the upper part of the tube and freeze in the pneumatic elements, resulting in shutting down of the entire system in a manner that is difficult to repair. Moveover, since a small ring builds very quickly the inside must be cleaned frequently, which is difficult in a small diameter tube, adding to the maintenance costs. Poor or inoperatiave upper level control may also lead to poor lower level control, with the result that some of the propulsion gas enters the molten metal through the orifice between the furnace and the pipe when the metal level drops below it. This is avoided by systems that rely solely upon gravity for the metal discharge, but they then have difficulty developing a sufficiently high speed jet of the metal that is desirable to entrain additional metal and to ensure that the stirring jet reaches across the full area of the bath. This phenomenon of gas injection into the metal pool is known as "bubbling", and in extreme cases can occur during each operational cycle; it disturbs the metal surface in the furnace and leads to increased dross and aluminum oxide formation which contribute to additional metal loss.

In the Fitzpatrick et al apparatus the metal jet is installed in one wall and is directed toward the opposite wall. In other systems such as those disclosed in U.S. Pat. Nos. 4,235,626 and 4,236,917 the entering jet is directed toward the furnace bottom, reducing the stirring efficiency and also causing increased erosion of the refractory lining.

Most of the systems in the prior art referred to above employ an aperture between the pipe and furnace interiors that is of about the same dimension as the inside diameter of the tube, and the exit velocities achieved are therefore necessarily much lower than can be achieved when using a smaller diameter orifice, so that the quantity of metal moved and the stirring intensity is reduced. To compensate for this it is proposed in the system disclosed in U.S. Pat. No. 4,235,626 to move the tube during operation to provide a larger stirring area, but this involves additional mechanical complexity with difficulties of maintenance in the harsh environment of a furnace and the relatively high speeds of movement required.

It will be apparent from the foregoing review that the stirring should allow complete and rapid mixing of the furnace bath contents without disturbing the surface, without requiring opening of the charging doors or shut down of the furnace burners, and without requiring any installation procedure when starting up the stirring process. Such a system would minimize dross formation, since the stirring would occur beneath the surface; the consequent elimination of thermal gradients in the bath would result in better temperature control and reduced oxidation at the surface caused by reduction of the surface temperature. In addition there would be more efficient dissolution of alloying elements, increased rate of remelting and reduction of energy consumption because of better heat transfer. All of this preferably is to be provided in apparatus that is as low as possible both in first cost of installation and subsequent maintenance cost.

DEFINITION OF THE INVENTION

It is the principal object of the present invention therefore to provide a new stirring apparatus for molten metal.

It is a specific object to provide such a system and apparatus giving stirring of satisfactory efficiency while meeting these first cost and maintenance cost requirements.

In accordance with the present invention there is provided stirring apparatus for stirring molten metal in a furnace chamber, the apparatus comprising:
- a reservoir chamber separate from the furnace chamber;
- a nozzle portion connecting the interior of the furnace and reservoir chambers for the passage of the molten metal between them through the nozzle;
- vacuum/pressure generating means connected to the reservoir chamber interior for alternatively and successively producing therein a vacuum for drawing molten metal into its interior from the furnace chamber, and a positive pressure for expelling the molten metal therefrom in the form of a stirring jet.

In such apparatus the ratio of the cross-section area of the nozzle to the horizontal cross-section area of the reservoir chamber interior is between 1:50 and 1:250, and preferably is in the range 1:60 to 1:150.

The ratio of the horizontal cross-section area of the reservoir chamber interior to the vertical distance between said upper and lower levels may be about from 1:10 to 1:20 and not less than 25 sq. cm. per cm. (10 sq. ins. per in.).

The ratio of the horizontal cross-section diameter of the reservoir chamber interior to the vertical distance between said upper and lower levels may be from about 1.0:1 to about 2.0:1.

Alternatively or in addition the reservoir chamber may comprise a removable cover portion to provide access to the interior of the chamber, the cover portion having mounted therein heating means for heating the reservoir chamber interior and the molten metal therein.

Preferably the reservoir interior is substantially circular in horizontal cross-section and the said nozzle portion is disposed to discharge the liquid metal passing through it into the reservoir interior substantially horizontally and tangentially to the said circular horizontal cross-section.

Preferably the said removable cover portion also carries a detector for detecting bubbling of pressurized gas into the furnace interior from the reservoir interior.

Preferably the periods during which molten metal is drawn into the reservoir interior and expelled therefrom are measured and their durations are adjusted to maintain control of the upper and lower levels of the molten metal in the reservoir interior.

The reservoir chamber may be mounted on a weighing device by which the weight of the reservoir chamber can be measured to determine the level of the molten metal therein and/or by which bubbling of pressurized gas into the furnace interior from the reservoir interior can be detected.

Preferably, the reservoir is disposed to expel the molten metal horizontally into the furnace chamber at one side adjacent one end, or at one end adjacent one side, toward the other side at an angle between 10 and 45 degrees to the plane of the said one end.

DESCRIPTION OF THE DRAWINGS

A stirring apparatus which is a particular preferred embodiment of the invention will now be described, by way of example, with reference to the accompanying diagrammatic drawings, wherein.

DESCRIPTION OF THE PREFERRED EMBODIMENTS

Figure 1:
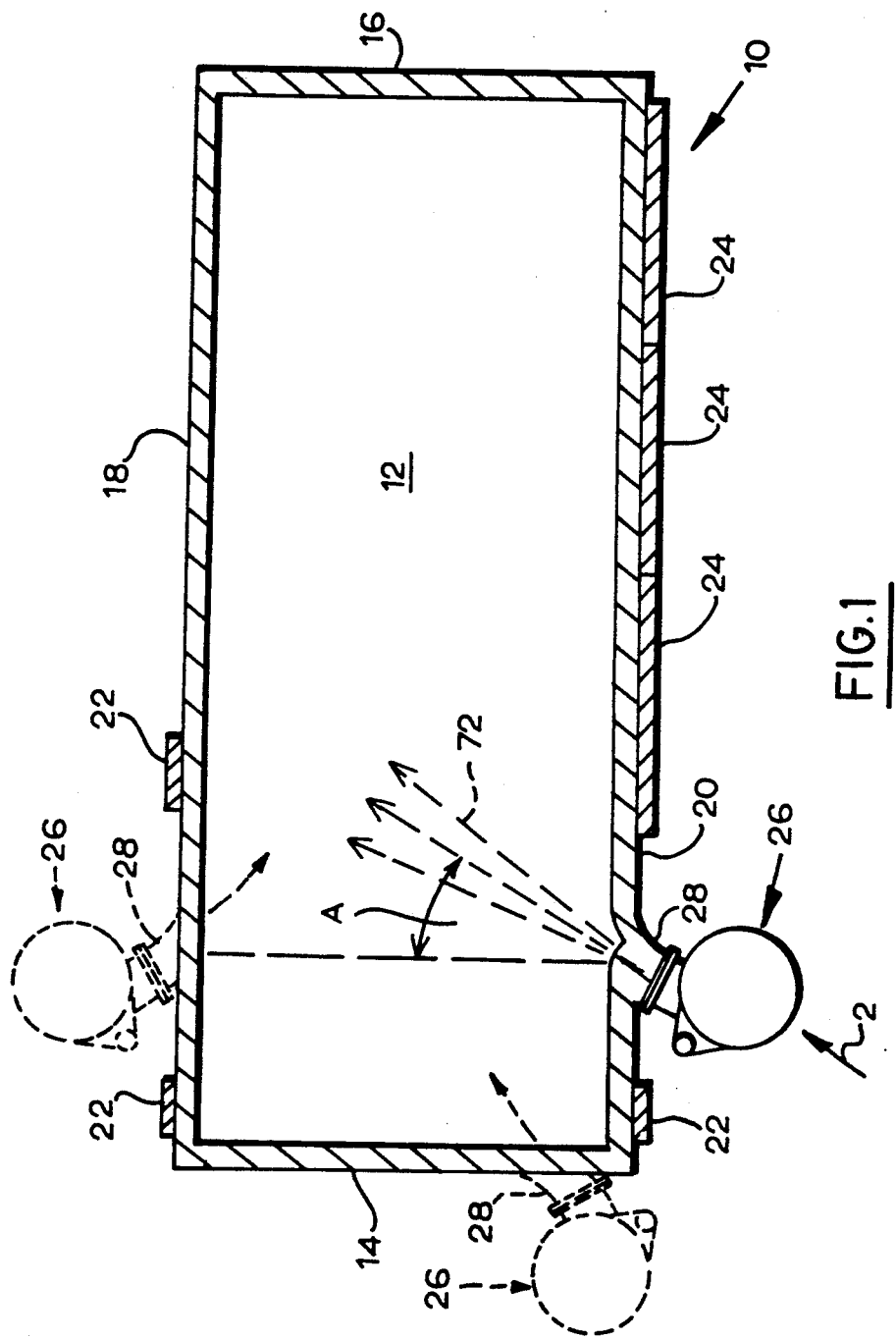
FIG. 1 is a horizontal cross-section through a rectangular-plan melting or casting furnace to show typical locations of the stirring apparatus relative to the furnace interior.
Figure 2:
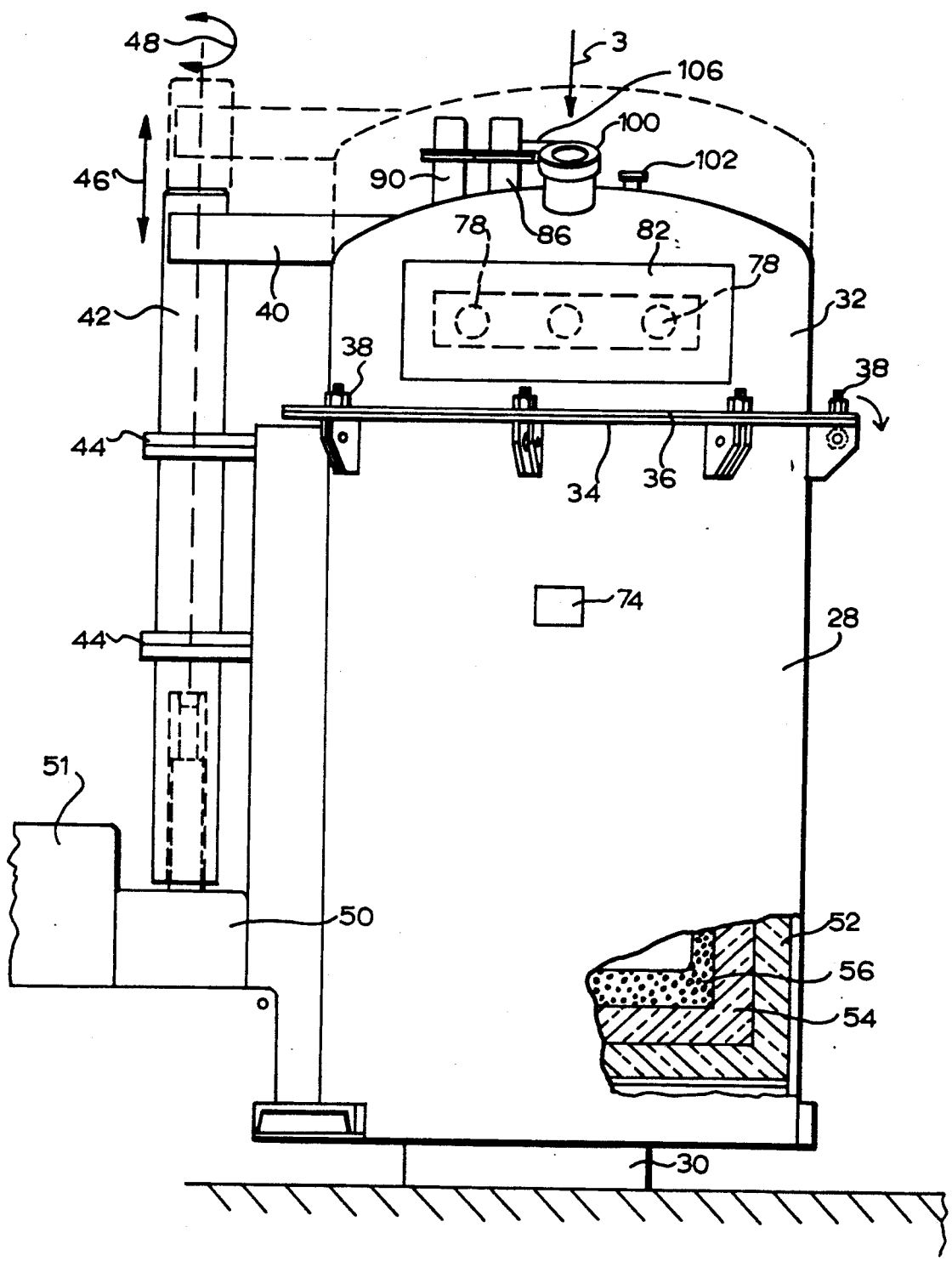
FIG. 2 is a side elevation of the stirring apparatus taken in the direction of the arrow 2 in FIG. 1.
Figure 3:
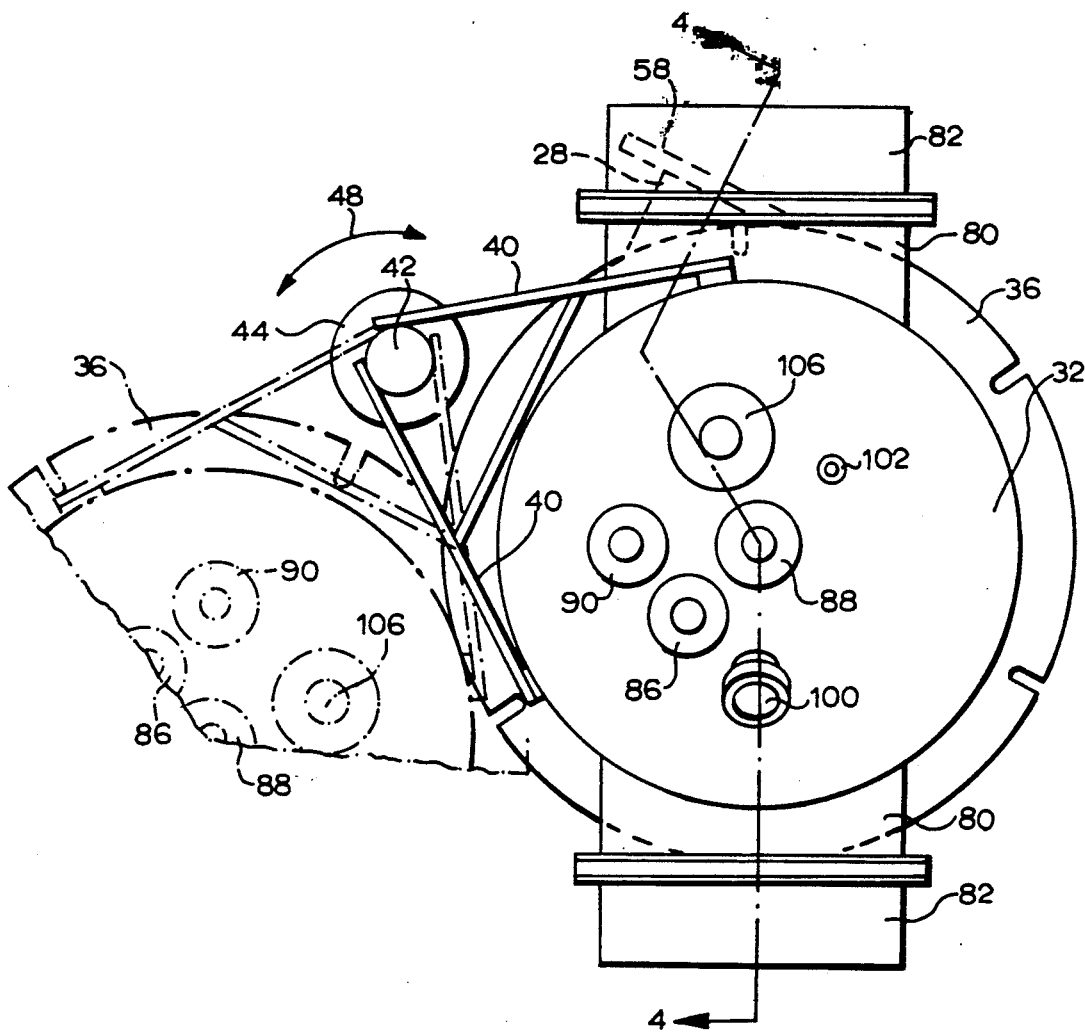
FIG. 3 is a plan view taken in the direction of the arrow 3 in FIG. 2.

The embodiment to be described is intended for use in conjunction with a shallow aluminum melting or casting furnace of rectangular shape as seen in plan, indicated generally by reference 10. The furnace has a floor 12, end walls 14 and 16 and side walls 18 and 20, inspection doors 22 being provided at various locations and the main charging doors 24 being provided along the side wall 20. The stirring apparatus is indicated generally by reference 26 and is disposed alongside the side wall 20, close to its junction with end wall 14, and with its nozzle portion 28 through which the molten metal is withdrawn from and returned to the furnace inclined at an angle A of about 10° to 45° to a plane parallel to the plane of the end wall 14, so that the jet of metal entering the bath is directed at a corresponding angle toward the other side wall 18, but also with a component toward the other end wall 16. If the jet is directed at smaller angles A toward the opposite side wall 18 poorer stirring will result, and in addition there is a much greater possibility of erosion of the refractory lining. There are many other suitable locations for the stirring apparatus, two of which are shown in broken lines in FIG. 1, the final choice often being dictated primarily by the location of a space around the furnace suitable for the apparatus.

Figure 4:
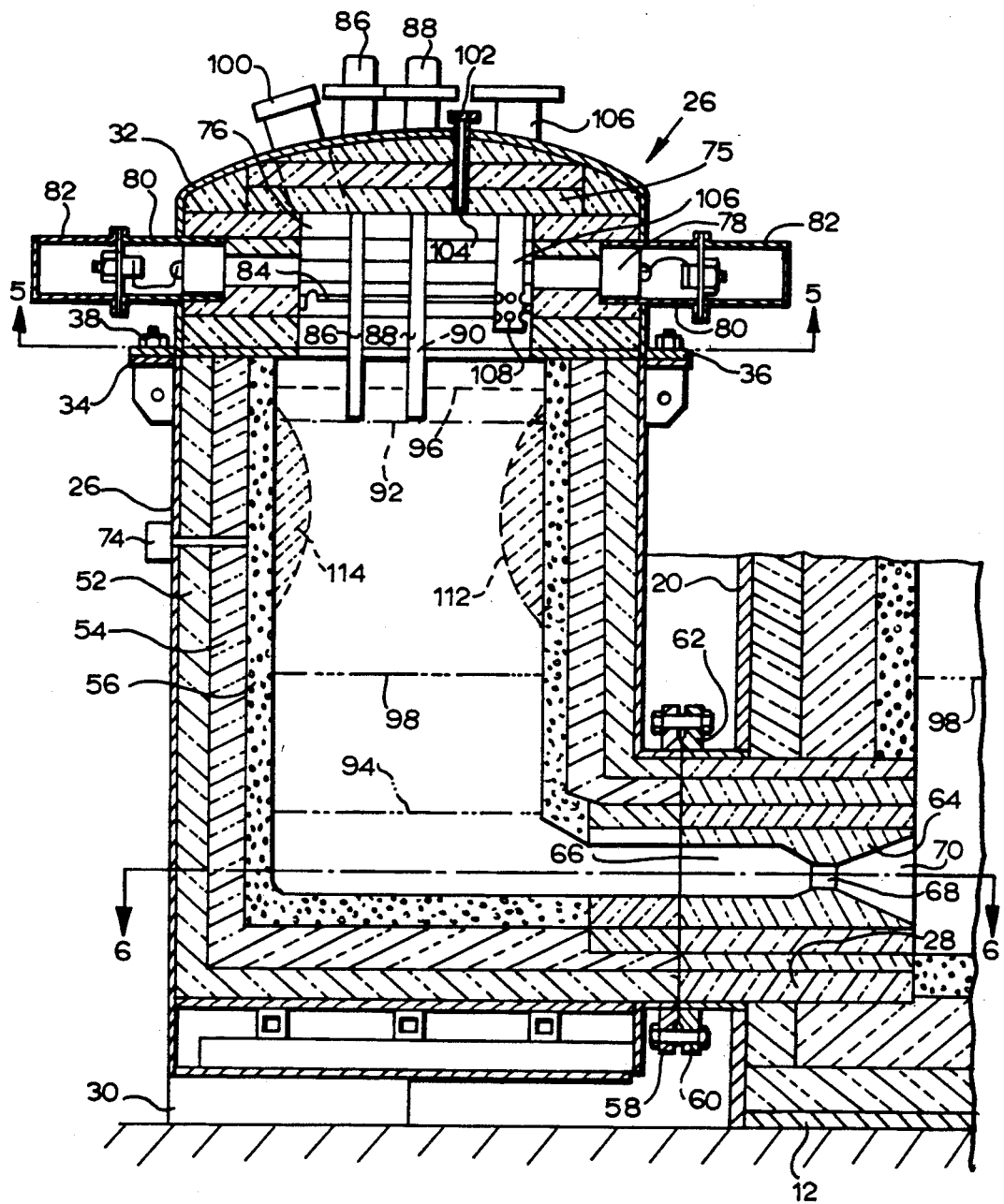
FIG. 4 is a vertical cross-section through the apparatus taken on the line 4—4 in FIG. 3, and including also the adjoining part of the furnace.
Figure 5:
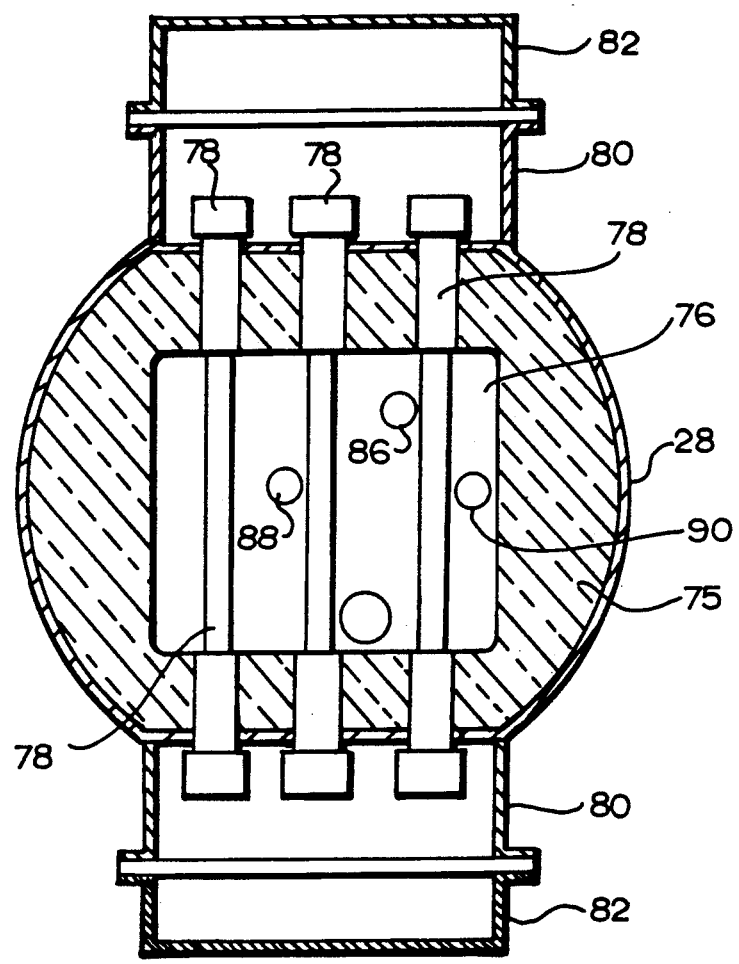
FIG. 5 is a horizontal cross-section taken on the line 5—5 in FIG. 4 to show one possible disposition of the heating elements, etc.
Figure 6:
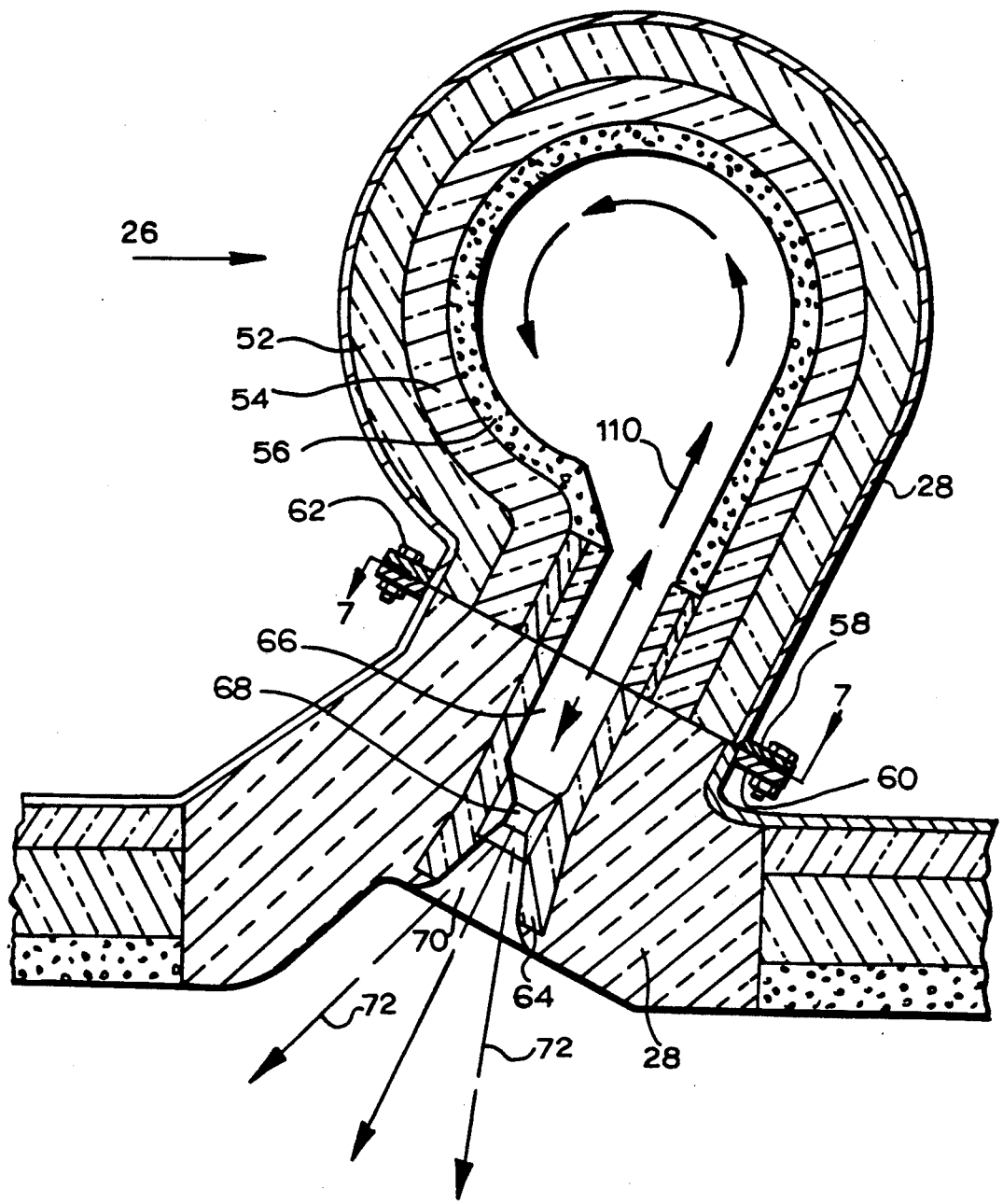
FIG. 6 is a horizontal cross-section on the line 6—6 in FIG. 4, including also the adjoining part of the furnace wall to show the disposition of the outlet nozzle.

Referring now also to FIGS. 2–6, the reservoir chamber of the stirring apparatus of the invention is quite separate from the furnace with which it is used although, as is seen in FIGS. 1, 4 and 6, its nozzle portion is necessarily built into the furnace wall so that it will discharge horizontally into the furnace a short distance above the furnace floor (usually about 15 to 40 centimeters), and so that turbulent flow will be obtained. The jet entrains additional metal with the result that strong stirring of the molten metal is obtained in a major portion of the furnace without causing surface waves, and without entraining dross lying on the metal surface.

In this embodiment the reservoir comprises a cylindrical lower casing 28 of sheet steel closed at its lower end and open at its upper end and resting on a suitable support therefore. The casing is illustrated as resting on a load cell 30 whose functions if provided will be described below. The open upper end is closed by a domed cover member 32 comprising a cylindrical upper casing of the same horizontal diameter, the two casings being provided with respective mating annular flanges 34 and 36, which are clamped together as required by easily removable pivoting bolts 38, or other equivalent clamping devices, with the usual air-tight seal (not shown) between the flanges.

The cover is fastened by brackets 40 to a vertical rod 42 mounted in vertically spaced bushings 44 supported from the lower casing 28, so as to be capable of vertical movement, as indicated by the arrows 46, and also for pivotal rotation about its longitudinal axis, as indicated by the arrows 48. The rod is moved vertically as required by a jack 50 at its lower end, the jack being operated by an electric motor 51, such operation of the jack moving the cover upward to the upper position shown in FIG. 2 in broken lines. Alternatively, a hydraulic jack and associated operating system can be employed. In this upper position the level detector members depending from the cover are lifted sufficiently high to clear the casing flange 34, as the cover is swung from its upper position directly above the reservoir to the removed position shown in chain-dotted lines in FIG. 3. In this removed position an operator will now have ready access to the underside of the cover and the reservoir interior. The swinging movement can be produced automatically at the top of the vertical movement by a suitable drive (not shown).

A table of dimensions for the specific embodiment described and illustrated herein is given below; it will be understood that these and other dimensions that are given in this specification are by way of example only and are not to be regarded as limiting, unless a limitation is specifically indicated. In this embodiment the lower cylindrical casing 28 and the external casing of the cover are of sheet steel of 10 mm thickness (0.375 in.). The lining of the reservoir, to enable it to withstand the repeated cyclic contact with the molten metal, consists of a first outer lining 52 of thermally insulating material (e.g. that sold by Plibrico under the trade mark "PLIVAFORM"); a suitable thickness is 100 mm (4 ins.). Then follows a second middle lining 54 of refractory material (e.g. that sold by Plibrico under the trade mark "LW1-28"), of 125 mm (5 ins.) thickness. The third inner lining 56 that is contacted by the metal is of a silicon carbide refractory material, such as that sold by Carborundum under the trade mark "REFRAX", a suitable thickness being 50 mm (2 ins.). These relatively thick insulating linings minimize the loss of heat while the metal is in the reservoir interior, while the relatively thick third layer of refractory provides a long-life internal lining despite the potential wear caused by the moving molten metal. The furnace is provided with equivalent but usually thicker linings of refractory material.

Figure 7:
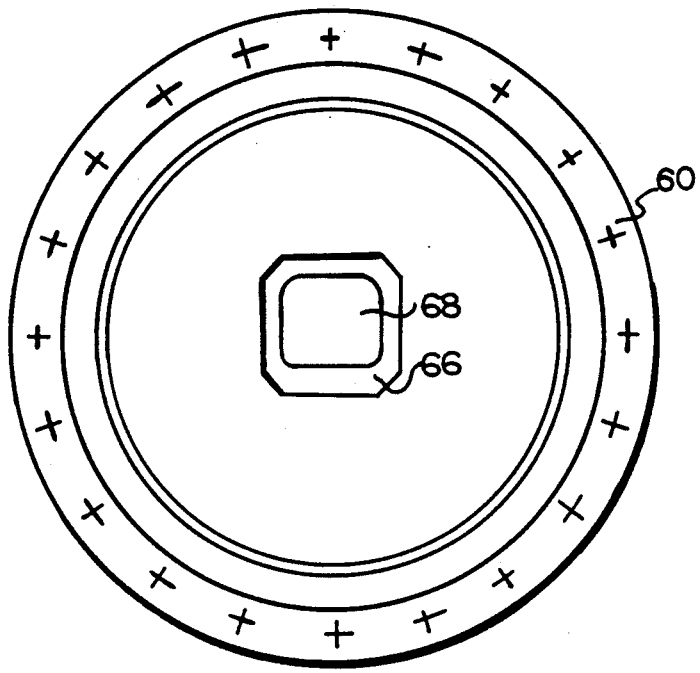
FIG. 7 is a cross-section on the line 7—7 in FIG. 6.

An opening is formed in the side wall and linings of the reservoir and a registering opening is formed in the linings and side wall of the furnace, the casing 28 and wall 20 being provided with respective mating circular flanges 58 and 60 provided at the outer wall 20 of the furnace, the flanges being connected by bolts 62, so that the reservoir is readily removable from the furnace when required for repair and relining, etc. A shaped block 64 of silicon carbide or other suitable refractory material is mounted in the side wall of the furnace, surrounded by its respective linings of refractory and insulating materials, and provides a specially shaped passage through which the molten metal passes between the furnace and reservoir interiors. The portion 66 of this passage at the reservoir side is of the same cross-section as the opening in the reservoir side wall, while the intermediate portion 68 is of much smaller diameter to constitute a nozzle producing a jet of the metal as it moves in both directions out of and into the reservoir. The portion 70 at the furnace side tapers outwardly toward the furnace interior so that the exiting jet of metal spreads outwards, as indicated by the arrows 72 in FIG. 6, to entrain as much as possible of the surrounding bath and increase the effectiveness of the stirring. In this embodiment the block 64 is about 46 cm (18 ins.) in length with the portion of the cross-section shown in FIG. 7 and having the circular nozzle aperture 68 of diameter 6.5 cm (2.5 ins.) and of cross-section area about 35 sq. cm. (5.0 sq. ins.)

All of the components of the lower part of the reservoir in the casing 28 may be regarded as being of "static" nature normally only requiring replacement at relatively long intervals. With the exception of a thermostat 74 located in the side wall of the lower part all of the "active" components of the stirrer are carried by the removable cover. The detecting element of the thermostat 74 only penetrates the linings 52 and 54 and is shielded from contact with the metal by inner lining 56; its control circuit is adjusted to compensate for the lower temperature that is measured.

The domed interior of the cover is lined with layers of insulating and refractory materials 75 to leave a central space 76, as is most clearly seen in FIGS. 4 and 5. Heating means, in this embodiment comprising three transversely-spaced, horizontally-extending silicon carbide, hot rod type electric heating elements 78, are mounted in the cover so as to radiate the heat produced into the interior, either directly or by reflection. The heaters are mounted securely at both ends to minimize breakage due to vibration, and are mounted through an external casing 80 at each end to be accessible for ready individual replacement (without moving the cover 32), each casing 80 having a removable cover 82. If required the heaters can be protected against direct splashes from the molten metal by respective horizontal shields 84.

These heaters have a number of important functions, namely:

(1) to preheat the reservoir interior prior to start-up or re-start to prevent freezing of the metal as it enters;

(2) to keep the metal remaining in the reservoir in the molten state when the stirrer is not in use;

(3) to keep the internal wall of the reservoir hot enough (above about 700° C. for aluminum) to minimize adherence of dross and facilitate its removal; and (4) to keep any dross on the wall at a high enough temperature to facilitate its removal at intervals. The heaters are of sufficient power rating to achieve these objectives and are operated under the control of the thermostat 74 by any suitable control system.

The cover also mounts three electrodes 86, 88 and 90 used for upper level control in the reservoir interior. The two electrodes 86 and 88, consisting of metal rods, constitute a normal upper level detector which are connected electrically when the metal reaches the normal upper level indicated by the broken line 92 in FIG. 4. The corresponding normal lower level is indicated by the broken line 94. Electrode 90 is shorter and together with electrode 86 constitutes an emergency level detector operative when the metal reaches the level 96 to shut down the pneumatic circuit completely and in a manner that will be described below in more detail, ensure that the reservoir interior is connected to atmosphere, so that it will empty to the equilibrium level with the furnace contents, indicated by the broken line 98. The cover further mounts an observation port 100 to permit operator inspection of the interior, a pilot pressure connection 102 for communicating the pressure in the reservoir interior, obtained through a bore 104, to pneumatic control system for a purpose described below, and the entry and exit pipe 106 through which gas is pumped into and removed from the reservoir. The pipe 106 is closed at its lower end and provided with radially directed holes 108, so that the gas entering the interior is not directed at the metal, minimising splashing of the metal and dross formation, and protecting the heating elements.

Figure 8A:
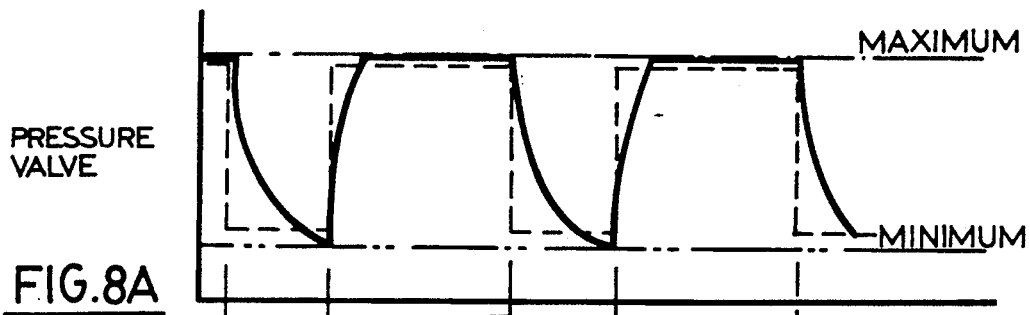
FIG. 8A is a graph of pressure value against time in the reservoir interior.
Figure 8B:
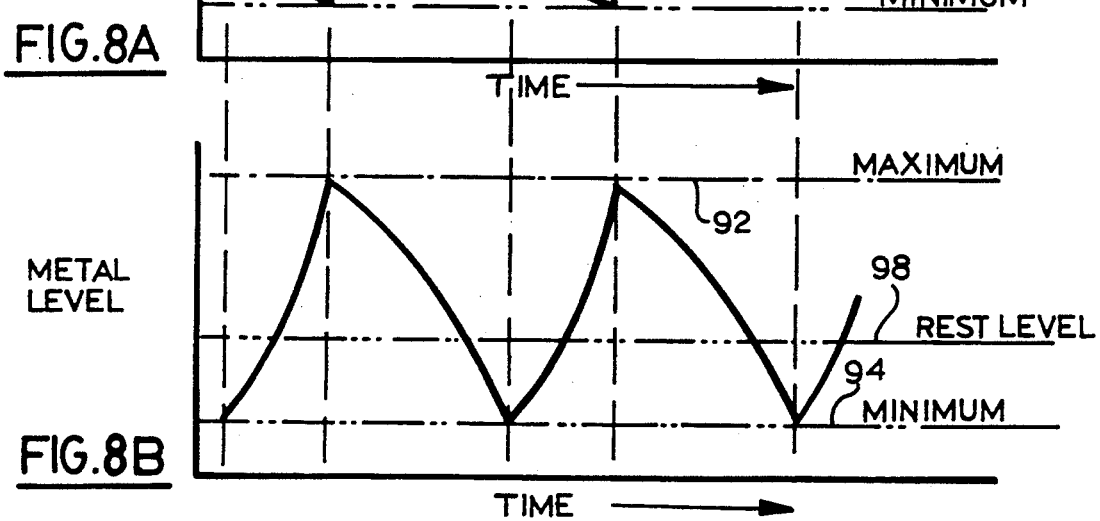
FIG. 8B is a corresponding graph of metal level against time in the reservoir interior.

A specific pneumatic circuit for operation and control of the system will be described in detail below; its function is successively and alternatively to create positive and negative pressure differentials between the reservoir and furnace interiors, so that the metal is drawn into and expelled from the reservoir interior. FIG. 8A shows in broken lines an "ideal" characteristic for the variation of the pressure value with time in the reservoir interior during approximately 2½ cycles of operation, while the solid line shows the more usual characteristic that is obtained. FIG. 8B shows the corresponding variation in the metal levels. Typically, the high pressure employed will be in the range 0.35 to 1.0 Kg.sq.cm. (5 to 14 p.s.i.), usually about 0.70 Kg.sq.cm. (10 p.s.i.), while the low pressure will be in the range −0.35 to −0.70 Kg.sq.cm. (−5 to −10 p.s.i.), usually about −0.50 Kg.sq.cm. (−7 p.s.i.).

Also typically the aspiration (vacuum) part of the cycle will take from 10 to 15 seconds, while the expulsion (pressure) part will take from 10 to 15 seconds, so that an entire cycle will usually take from about 20 to about 30 seconds. Because of the generous dimensions of the reservoir the performance of the stirrer is not as restricted by design constraints, but principally by the amount of compressed air delivered, which is in turn determined by the size of the apparatus supplying the compressed air, these parameters determining the total period of a cycle, and hence the metal flow rate and the velocity of the metal jet.

Some dimensions for this specific embodiment have been given above, and the following are further pertinent dimensions:

| | |
|---|---|
| Exterior diameter of casing 28 | 117 cm. (46 ins.) |
| Interior diameter of chamber | 60.0 cm. (24 ins.) |
| Interior cross-section area | 2,830 sq. cm. (450 sq. ins.) |
| Heater 78 rating (each) | 8 Kw. |
| Height of casing 28 | 168 cm. (66 ins.) |
| Height including cover 36 | 218 cm. (86 ins.) |
| Vertical travel of cover | 40 cm. (16 ins.) |
| Height levels 92 to 94 | 110 cm. (43 ins.) |
| Interior volume | 1800 Liters (63 cb ft) |
| Maximum capacity | 650 kg. (1430 lbs.) |
| Metal mass change per cycle | 550–600 kg. (1200–1320 lbs.) |
| Nozzle cross-section area | 35 sq. cm. (5.0 sq. ins.) |

With the relatively large quantity of metal moved during a cycle and the relatively small cross-section area of the nozzle a relatively high velocity jet is obtained, typically about 4–12 meters/second (800–2400 f.p.m.), more usually 6–10 meters/second (1200–2000 f.p.m.), depending upon operating conditions. With a cycle time of 20 seconds the maximum average total flow is about 1800 kg/min (4,000 lbs./min.). The mass of metal entrained in the furnace will be five to fifteen times the amount emerging from the nozzle, and with a 40 ton furnace this will amount to about 15 percent of the furnace volume per cycle, so that the furnace is completely stirred in a few minutes without appreciable disturbances appearing at the bath surface.

It is important for operation of the invention that the reservoir interior be of relatively large horizontal cross-section area; it will usually for practical reasons be a vertical cylinder although other cross-sections such as square and rectangular are also possible, and the minimum diameter preferred is 50 cm. (20 ins.), to give a minimum cross-section area of 1960 sq.cm. (314 sq.ins.) The maximum diameter is much more a matter of choice, depending upon factors such as the space available around the furnace, but the advantages of the large diameter, as described below, do not increase porportionately with the diameter, and a practical maximum is 75 cm. (30 ins.) to give a cross-section area of 4,417 sq.cm. (707 sq.ins.). As described above, the cross-section area of the nozzle 68 of the preferred embodiment is 35 sq.cm. (5.0 sq.ins.), and it will be seen that the ratio of these two areas is 1:90. Practical minimum and maximum dimensions for the nozzle are from 3.8 cm. (1.5 ins.) to 10.0 cm. (4 ins.) respectively, corresponding to cross-section areas respectively of about 11.3 sq.cm. (1.77 sq.ins.) to 79 sq.cm. (12.5 sq.ins.) A practical range for the ratio of the two areas is from 1:50 to 1:250, and preferably from 1:60 to 1:150. These high ratios are to be contrasted with the value of 1:1 for most of the prior art, and the value of 1:16 for the apparatus in U.S. Pat. No. 4,008,884.

Another advantage of the large volume and large cross-section of the reservoir is the large mass of metal that can be moved which, moving at a substantial speed, therefore has a high total momentum, which speeds the mixing while permitting relatively long cycle times. This feature provides a more predictable control, since there are larger periods available to initiate and confirm each part of the cycle.

Another manner in which the relatively short, large diameter reservoirs that characterise the invention may be defined is the ratio between the internal horizontal diamter of the interior chamber containing the molten metal and the vertical height between the normal upper level 92 and the normal lower level 94. In this embodiment the diameter is 60 cm. (24 ins.) while the vertical height is about 90 cm. (36 ins.), so that the ratio is 1.50:1. A practical range of values for this ratio is from about 1.0:1 to about 2.0:1.

Yet another characterisation is the ratio of the internal horizontal cross-section area of the interior chamber relative to the vertical height between the levels 92 and 94 and preferably this is not less than about 25 sq.cm. per cm (10 sq.ins. per in).

The advantage of the use of a flow-restricting nozzle is, as described above, to produce a metal-entraining, high-velocity jet having the necessary range of action. It is found that by careful choice of the nozzle size, the position of the nozzle, and the angle at which the jet enters the bath, it is possible for the mixing action obtained to involve the entire bath and, despite the high speed of the entering metal, this is obtained, without appreciable disturbance of the metal surface in the bath. The use of the smaller nozzles will require the use of higher pressures in the reservoir to obtain the necessary metal displacement.

The flow-restricting nozzle also has a beneficial effect on the flow of metal into the reservoir interior, especially if as is illustrated by FIG. 6, it is disposed to direct the ingoing jet of metal tangentially to the horizontal circular cross-section of the reservoir interior. The typical flow of the stream as seen in a horizontal cross-section is indicated in FIG. 6 by the arrows 110. The rapid swirling that is thus produced in the entering metal assists in reducing the formation of dross, and its subsequent build up on the upper part of the inner wall, especially since this upper part is held at elevated temperature by the adjacent heaters 78. The dross usually accumulates as a body of the shape and at the location indicated in FIG. 4 by the broken lines 112 and 114. In a reservoir of square or rectangular cross-section this swirling action cannot be obtained, and the build-up 114 on the side directly opposite to that impacted by the ingoing jet is found to grow more quickly than on the other side. The relatively small diameter tubes of the prior art apparatus would not permit adequate development of the beneficial scouring action obtained within the cylindrical reservoir.

In practice it is impossible to avoid the formation of a dross ring just below the upper level 92, but its effect is substantially mitigated by the relatively large diameter of the interior. Thus, it is quite usual for dross to deposit at a rate as high as 3 kg. (6.6 lbs) per hour, and in the narrow prior art tubes this means that at periods of about 5-7 hours the stirring process must be stopped and the ring scraped out. Even before the narrow prior art tubes become too obstructed for satisfactory flow, the dross ring can cause severe problems by contacting and short-circuiting the upper level control electrodes, so that the control becomes ineffective until the ring is removed. The period before which such build-up becomes serious with the apparatus of the invention is increased to about 5-10 days, the cleaning operation itself taking only about ½ an hour. The period is also increased considerably by the heaters mounted safely in the cover. Moreover, it is a relatively simple operation to remove the cover and remove the hot, soft, easily-separated ring in the wide easily-accessible reservoir interior.

Figure 9:
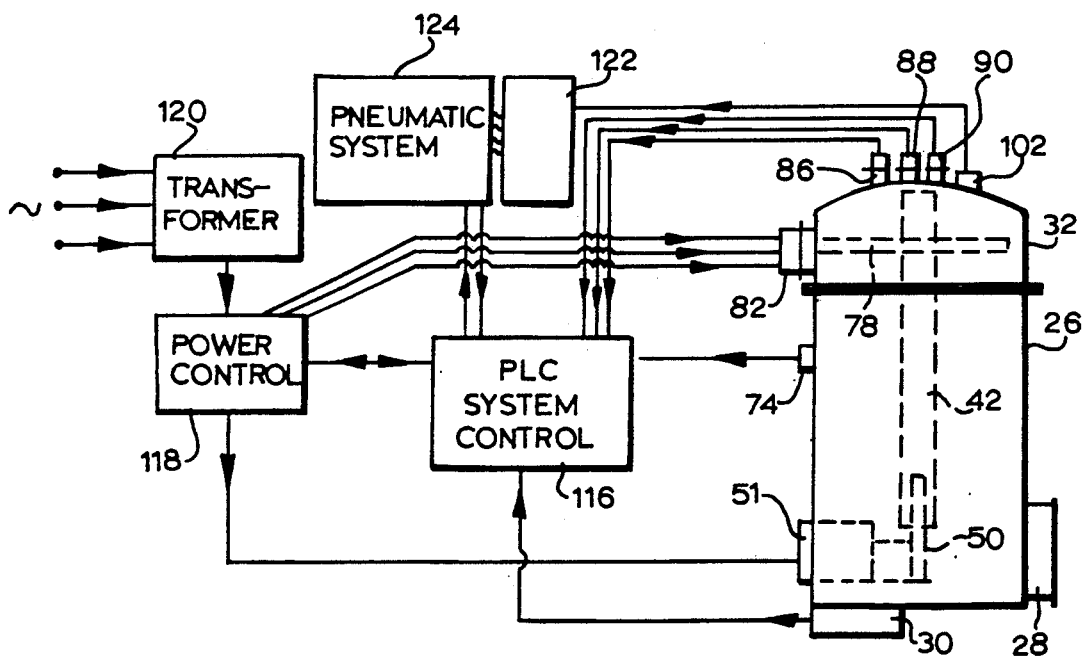
FIG. 9 illustrates schematically an electrical layout for the apparatus.

The electrical system is shown diagrammatically in FIG. 9. The level electrodes 86, 88 and 90, and the load cell 30 (if provided) are connected to a system control 116 consisting of a programmable logic controller (PLC) controlling a power control unit 118, which in turn controls the supply of power to the heaters 78 and the motor 51 for the jack 50, the power being obtained from a three-phase transformer 120. The system control also controls a pneumatic system 122, 124 for the stirrer operation, and is arranged in known manner to provide visual indications and permanent records as to their operation.

Figure 10:
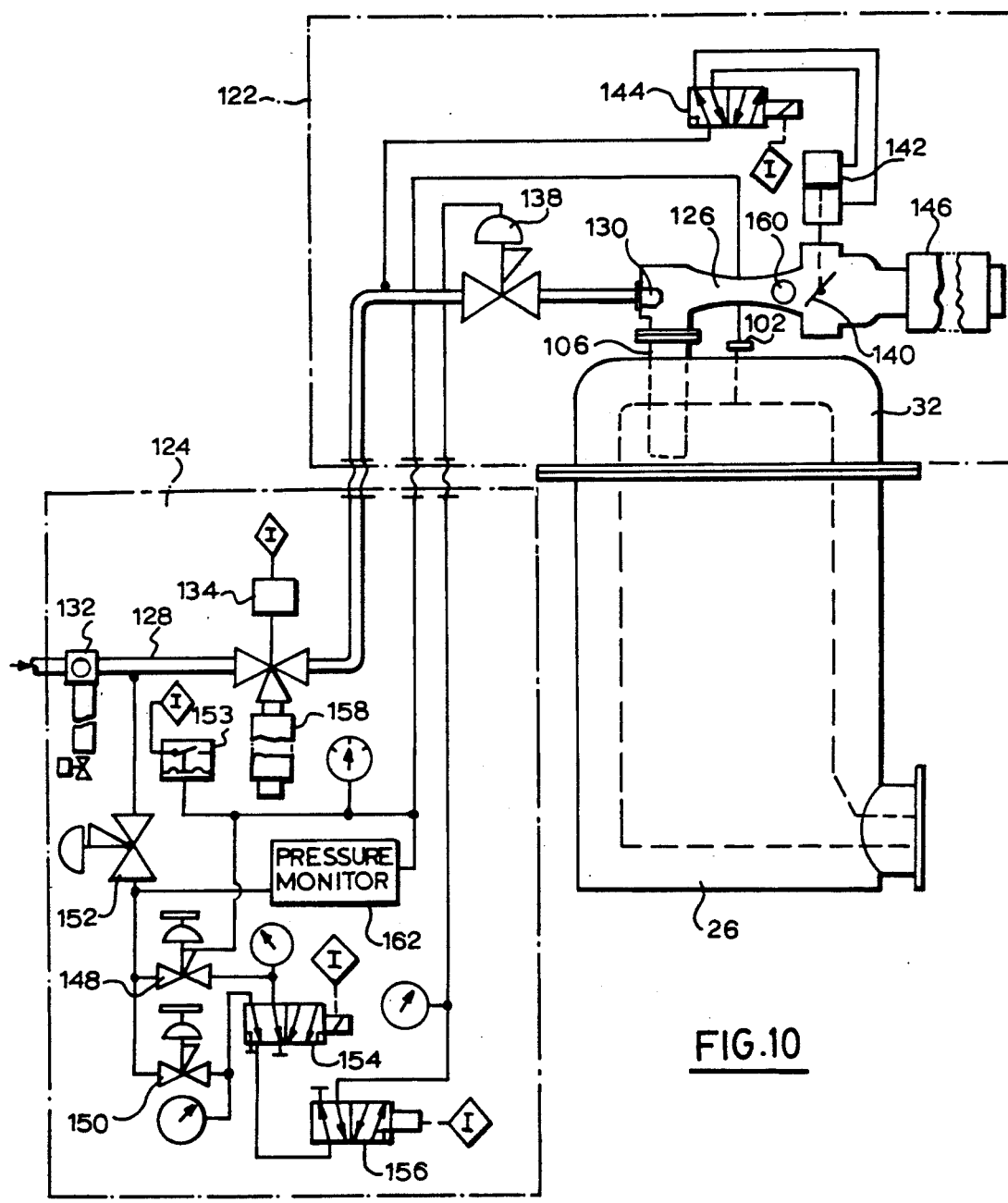
FIG. 10 illustrates schematically a pneumatic circuit for the apparatus.

A typical pneumatic system is shown diagrammatically in FIG. 10; although indicated for convenience as a single block 122, 124 in FIG. 9, in practice the part 122 is mounted on the cover, while the part 124 is mounted alongside the reservoir, the two parts being connected by flexible high pressure metal hoses to permit the cover to be removed, as described above. In this embodiment the vacuum is provided by an ejector 126, and this has the advantage of low cost and simplicity in that the vaccuum is produced by the action of the compressed air that provides the positive pressure, the ejector being connected directly to the flange 106 on the cover. The pressurised air is supplied to the injector via pipe 128 from a suitable compressor pump (not shown) and is directed at the injector throat by a nozzle 130 sized to send the air pressure employed, which can vary from about 1.05 to 5.6 Kg.sq.cm. (15 to 80 p.s.i.), pressures of 1.4 Kg.sq.cm. (20 p.s.i.) and 4.2 Kg.sq.cm. (60 p.s.i.) having been used successfully with an ejector of 7.5 cm. (3 ins.) diameter. The air first passes through a colloidal filter 132 with an automatic drain to remove moisture and ensure that none can return to the pump, through a solenoid-controlled exhaust valve 134, and then through a large volume capability main pressure regulator valve 138 to the nozzle 130. The outlet of the ejector can be closed and opened under the control of the system control 116 by a piston-operated butterfly valve 140, operated by a piston actuator 142 under the control of a solenoid operated actuator valve 144. With the butterfly valve open the pressurized air from the nozzle creates a vacuum and the outlet 106, while with it closed a positive pressure is created. The ejector exhaust noise is reduced as much as possible by a muffler 146. By using the smallest possible piston actuator 142 with an over-sized actuator valve 144 it is possible to obtain opening and shutting speeds of the butterfly valve of less than 0.025 seconds. This high operating speed results in very quick and stable reversal of the metal movement, and provides high frequency cycling with only the one moving part in the air stream.

The air pressure required for the positive pressure part of the cycle is much less than that required to create the vacuum and the required pressure is applied as needed by operation of the regulator valve 138. The value of the lower pressure for the pressurization mode is set by a regulator valve 148, while the higher value for the evacuation mode is set by a regulator valve 150, both being supplied with operative air from line 128 via a regulator valve 152 that stabilizes the air pressure to compensate for the fluctuations produced therein by operation of the system. The valve 148 is also feedback controlled using the resevoir internal pressure obtained from outlet 102, thus obtaining high speed response and pressurization, so that reversal of the metal movement takes place within a few millimeters upon pressure reversal. An excess pressure at outlet 102 is indicated by diaphragm switch 153. The pilot pressure supplied to valve 138 to make it apply the required pressure at the nozzle 130 is selected by operation of a four-way, solenoid-operated valve 154, the air being fed thereto via a solenoid-operated shut-off valve 156 that can operate to shut down the regulator if safety requires it. Again for safety purposes, the exhaust valve 134 can be operated to connect the line 128 to atmosphere through a muffler 158, thus cutting off all supply of air to the ejector. When de-energized the valve 144 quickly forces the butterfly valve to an open state, so that it is already open before the compressed air supply is cut off, thus connecting the resevoir interior to atmosphere, so that the liquid level falls under gravity to the rest level 98. These emergency shut-down mechanisms will be operated as the result, for example, of detection of too high a level of metal by the electrodes, an overpressure detection at outlet 102, or operation of a panic button by an operator. An independent security device consists of a rupture disc 160 on the ejector that will break independently of the system control if an overpressure develops.

Alternatively, the main pressure regulator valve 138 can be programmed directly from the system control 116 with a programmable logic controller operating through a suitable current-to-pressure pilot converter.

Accurate level control between minimum and maximum is important to ensure satisfactory operation, and the large cross-section of the resevoir (about 14 times greater than the prior art systems) facilitates this, allowing more precise control, since the vertical movement of the metal is slower, giving more predictable operation and control of the high-momentum and inertia components. In one mode of operation the reservoir is filled until the electrodes 86, 88 indicate that level 92 has been reached; the system is then made responsive to an upper level signal just less than that already indicated, so that for a predetermined number of cycles the molten metal does not touch the electrodes, considerably increasing their life. The system can be arranged so that the electrodes are touched perhaps once each 10-15 minutes to ensure that the system is functioning properly.

Accurate lower level control is more difficult and is advantageously effected by determining when the level has gone below the top of the passage part 66, so that the expulsion gas is bubbling into the furnace. This generation and movement of gas bubbles generates corresponding small vibrations of the internal gas pressure which can be detected by a pressure disturbance monitor of suitable sensitivity and cause readily-detected corresponding variations in the signals obtained from the monitor. The detection of this signal can then be used for automatic correction of the lower level by shortening the expulsion phase.

Figure 11:
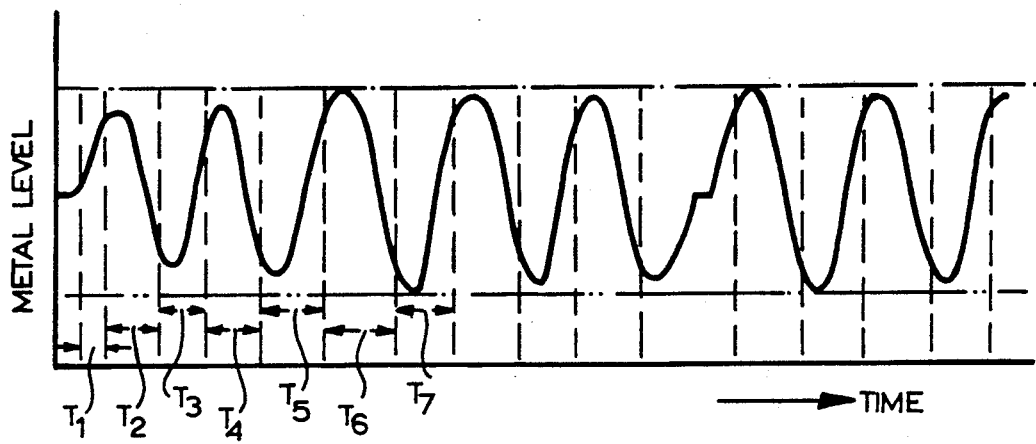
FIG. 11 is a graph to illustrate a new method of upper and lower level control employed with the apparatus.

An example of the mode of operation of such a control system is illustrated by FIG. 11. Upon start-up the suction phase starts with a somewhat shortened period $T_1$, and the expulsion phase with a corresponding shortened period $T_2$. Both of these periods terminate without the detection of signals indicating that the reservoir was adequately full or empty, and the succeeding corresponding periods $T_3$ and $T_4$ are somewhat longer. If still the extreme limit signals are not obtained the periods are again increased; at the end of suction period $T_5$ the electrodes 86,88 indicate that the upper level has been reached, and subsequent suction periods are shortened slightly for a substantial period, say 10—minutes, when again they are increased until upper level detection is obtained. Similarily, if at the end of injection period $T_6$, or at the beginning of period $T_7$, an indication is obtained by the pressure disturbance monitor that bubbling has occurred, the subsequent periods are shortened for the same substantial period. This cycle is then repeated at whatever length of substantial period is considered suitable. In this way the system is always dynamically adjusting itself to maximize the volume of metal displaced during each operational cycle while minimizing bubbling.

Figure 12:
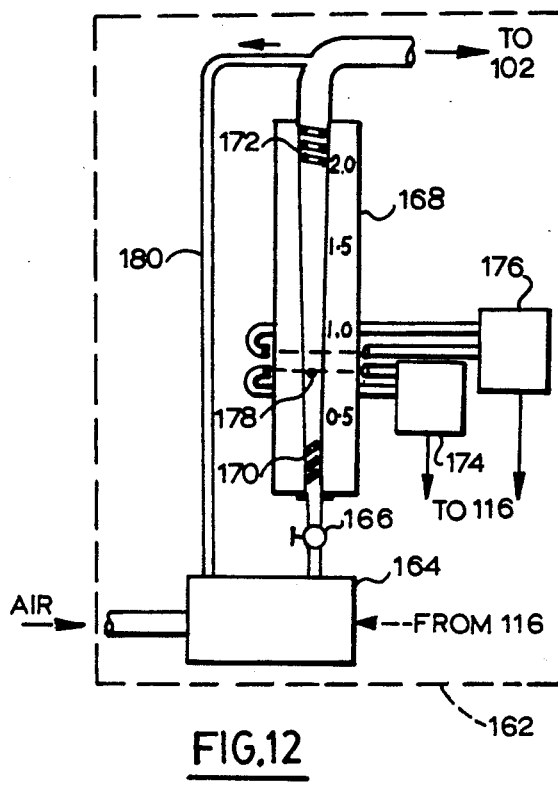
FIG. 12 illustates schematically a pressure disturbance monitor for use in detecting bubbling and pressure reversal in the resevoir interior.

An example of a suitable pressure disturbance monitor is shown in FIG. 12 and has the general reference 162 in FIG. 10. A small constant flow of air obtained from the regulator 152 is fed in the monitor through a constant differential pressure controller system 164 (e.g. Moore Instrument Model 63 BDL) and an adjustable needle valve 166 to a transparent rotameter 168 (Matheson 7262). The rotameter is modified by the provision of lower and upper bounce springs 170 and 172 and lower and upper infrared beam position detectors units 174 and 176 (e.g. SKAN-A-MATIC MODEL P-L 34024), which monitor the position along the rotameter tube of the float 178. The outlet of the rotameter is connected to the pipe leading to outlet 102, a small amount of the air being fed via pipe 180 back to the controller 164 for regulation.

The needle valve 166 is adjusted to give the desired flow rate (e.g. 0.75 SCFH) at which the float 178 just cuts the beam provided by lower position indicator 174 while the pump pressure is stable, i.e. no disturbances. Any bubbling is obtained toward the end of a pressurization cycle and its start causes a sudden, prompt very small pressure drop in the air feed line results in a corresponding "jump up" of the float in the tube, since the change is too rapid to be compensated by the control 164. The jump is sufficient for the float to cut the beam of the upper detector 176 which activates an input to the system control 116 to immediately switch the cycle from pressurization to suction. It is found that the device is sufficiently fast and sensitive that bubbling can be limited to one small bubble, the low inertia of the float enabling it to respond in milliseconds to the pressure changes.

The device can also be used for pump cycle monitoring, both electrically in the system, and visually by watching the movements of the float. Thus, each pressure reversal results in a very strong float movement, sufficient for it to engage the respective rebound spring. For example, if the system is in pressure mode with the pressure stable then reversal to the vacuum mode will move the float up through the beam of the high detector 176 to engage the spring 172 and return. Similarly reversal from vacuum to pressure moves the float down out of the beam of the lower detector 174 to the spring 170 and back again. The system control detects the sequences of the signals obtained and uses them as a positive means of monitoring the proper operation of the ejector. A lack of correct signals from the monitor will result in the operation being stopped and is very useful, for example, in detecting any improper operation of the butterfly valve 140, or any abnormal pressure perturbation caused by rupture of the disc 160.

Alternatively, the pneumatic type controller 164 can be replaced by a pressure-to-current transducer which receives a feedback signal (broken line) from the system control 116, this feedback being obtained from the lower level detector 174 as a position control output signal.

Figure 13:
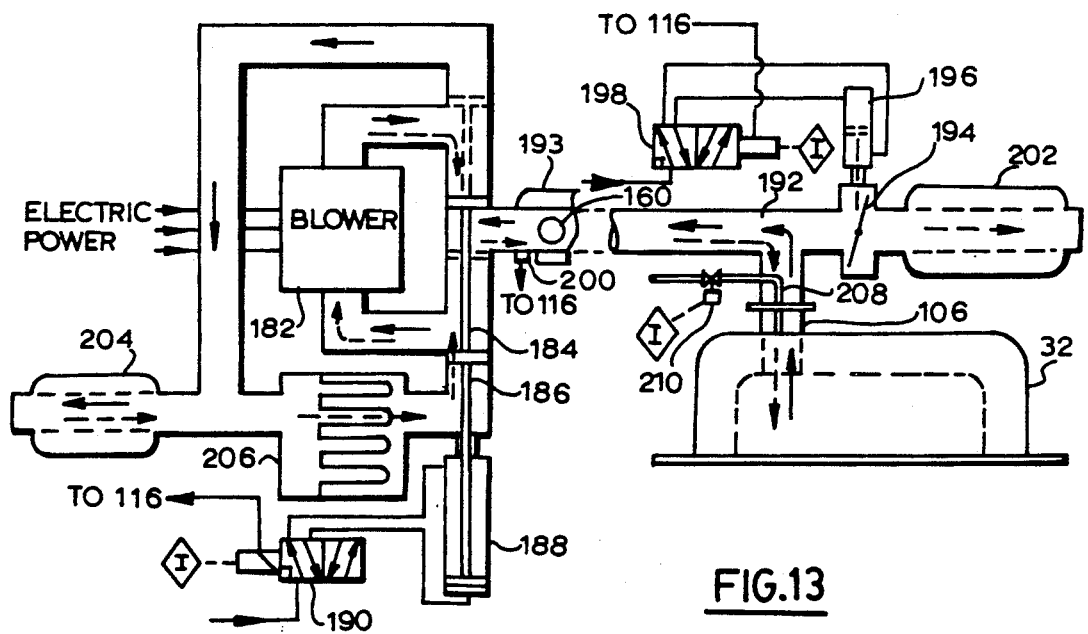
FIG. 13 illustrates schematically an alternative vacuum/pressure supply means for the apparatus.

The use of an ejector to obtain a suitable vacuum does have the disadvantages that it is somewhat inefficient, although this is compensated by its simplicity and ruggedness. If a suitable source of compressed air is not already available then it may be preferred to use a blower, and an example of a suitable system is illustrated by FIG. 13. A blower 182 of suitable size is arranged so that it acts alternatively in vacuum or pressure mode under the control of a spool vale 184 operated by double-acting piston 186 moving in a cylinder 188 under the control of solenoid-operated valve 190. The blower assembly is connected to the entry port 106 of the cover 32 by a special piece of pipe 192, which should be sufficiently long and be of sufficiently large diameter that it has a larger inner volume than the volume of air extracted in vacuum mode as the metal moves between minimum and maximum levels, thereby ensuring that the heated air from the resevoir interior does not reach the blower and overheat it. For this purpose the pipe 192 should also be designed for high heat dissipation at the end nearest the blower, such as by the provision of radial heat-dissipating vanes 193. This arrangement does mean that the hot air that was removed from the resvoir in evacuation mode is pumped back into the resevoir, reducing the cooling of the resevoir walls by the entering air.

A butterfly valve 194 operated by a motor 196 under the control of solenoid-operated valve 198 constitutes a start-up and heat-exhaust valve. During start-up the valve is opened to permit the blower motor to be brought up to operating speed and is then closed in both vacuum and pressure modes. A thermostat 200 detects the air temperature close to the blower and if it becomes too high the valve 194 is opened in order to cool down the system, the valve being closed when a satisfactory lower temperature is reached. Mufflers 202 and 204 are provided to reduce the system noise and air entering the system passes through a filter 206. Such a system has high pneumatic efficiency and low heat loss due to the closed loop operation. Because of the closed loop it also provides the possibility of reducing the dross formation by injecting inert gas through an inlet 208 and valve 210 to replace as much as possible of the air in the system.

The weighing device comprising the load cell 30 can also be used for level control and the detection of bubbling, the device supporting the reservoir and measuring the different loads on it caused by the reservoir when filled to the different levels 92, 94 and 96. These loads are proportional to the corresponding weights of the reservoir, and cause the production of corresponding signals that can be used directly for level control.

The cell can therefore be used for calibration purposes, or to determine whether the lower level control has drifted to too low a level. The generation and movement of gas bubbles in the resevoir will produce corresponding small vibrations of the resevoir which can be detected by the load cell and cause the production of readily-detected signals which, when produced, indicate that the expulsion phase should be shortened.

We claim:

1. Stirring apparatus for use in combination with a furnace having a furnace chamber containing molten metal and for stirring the molten metal therein, the apparatus comprising:

a reservoir chamber separate from the furnace chamber;

a nozzle portion which when the reservoir chamber and the furnace chamber are connected together connects the interior of the furnace and reservoir chambers for the passage of the molten metal between them through the nozzle;

vacuum/pressure generating means connected to the reservoir chamber interior for alternatively and successively producing therein a vacuum for drawing molten metal into its interior from the furnace chamber, and a positive pressure for expelling the molten metal therefrom into the furnace chamber in the form of a stirring jet;

wherein the ratio of the cross-section area of the nozzle to the horizontal cross-section area of the reservoir chamber interior is between 1:50 and 1:250.

2. Stirring apparatus as claimed in claim 1, wherein the said ratio is in the range 1:60 to 1:150.

3. Stirring apparatus as claimed in claim 1, wherein the reservoir interior is substantially circular in horizontal cross-section and the said nozzle portion is disposed to discharge the molten metal passing through it substantially horizontally and tangentially to the said circular horizontal cross-section, so that the entering molten metal swirls in the reservoir interior.

4. Stirring apparatus as claimed in claim 1, wherein the molten metal is drawn into the reservoir chamber interior until it reaches an upper level therein, and is expelled until it reaches a lower level therein; and wherein the ratio of the horizontal cross-section diameter of the reservoir chamber interior to the vertical distance between said upper and lower levels is about 1.0:1 to 2.0:1.

5. Stirring apparatus as claimed in claim 1, wherein the reservoir chamber is mounted on a weighing device by which the weight of the reservoir chamber is measured to determine the level of the molten metal therein.

6. Stirring apparatus as claimed in claim 1, wherein the reservoir chamber is mounted on a load cell by which the weight of the reservoir chamber is measured to determine the level of the molten metal therein.

7. Stirring apparatus as claimed in claim 1, wherein the reservoir chamber is mounted on a weighing device by which the weight of the reservoir chamber is measured to detect changes therein resulting from bubbling or pressurized gas through the nozzle portion into the furnace interior from the reservoir interior.

8. Stirring apparatus for use in combination with a furnace having a furnace chamber containing molten metal and for stirring the molten metal therein, the apparatus comprising:

a reservoir chamber separate from the furnace chamber;

a nozzle portion which when the reservoir chamber and the furnace chamber are connected together connects the interior of the furnace and reservoir chambers for the passage of the molten metal between them through the nozzle;

vacuum/pressure generating means connected to the reservoir chamber interior for alternatively and successively producing therein a vacuum for drawing molten metal into its interior from the furnace chamber, and a positive pressure for expelling the molten metal therefrom into the furnace chamber in the form of a stirring jet;

wherein the reservoir chamber has an upper level which the molten metal reaches when it is drawn into the reservoir chamber interior, and a lower level which the molten metal reaches when it is expelled form the reservoir chamber interior; and wherein the ratio of the horizontal cross-section diameter of the reservoir chamber interior to the vertical distance between said upper and lower levels is from about 1.0:1 to 2.0:1.

9. Stirring aparatus as claimed in claim 8, wherein the reservoir interior is substantially circular in horizontal cross-section and the said nozzle portion is disposed to discharge the molten metal passing through it substantially horizontally and tangentially to the said circular horizontal cross-section, so that the entering molten metal swirls in the reservoir interior.

10. Stirring apparatus for use in combination with a furnace having a furnace chamber containing molten metal and for stirring the molten metal therein, the apparatus comprising:

a reservoir chamber separate from the furnace chamber;

a nozzle portion which when the reservoir chamber and the furnace chamber are connected together connects the interior of the furnace and reservoir chambers for the passage of the molten metal between them through the nozzle;

vacuum/pressure generating means connected to the reservoir chamber interior for alternatively and successively producing therein a vacuum for drawing molten metal into its interior from the furnace chamber, and a positive pressure for expelling the molten metal therefrom into the furnace chamber in the form of a stirring jet;

wherein the reservoir chamber comprises a removable cover portion to provide access to the interior of the chamber, the cover portion having mounted therein heating means for heating the reservoir chamber interior and the molten metal therein.

11. Stirring apparatus as claimed in claim 10, and comprising means mounting the cover portion for vertical movement relative to the remainder of the reservoir to separate it therefrom, and also for transverse movement relative to the said remainder to facilitate access to the reservoir interior.

12. Stirring apparatus as claimed in claim 10, wherein the said removable cover poriton also carries level control electrodes extending into the reservoir interior for determining the upper level of molten metal in the interior.

13. Stirring apparatus as claimed in claim 10, wherein the said removable cover portion carries means for drawing a vacuum in the reservoir interior and for supplying gas under pressure thereto.

14. Stirring apparatus as claimed in claim 10, and including a pressure detector for detecting pressure variations in the reservoir interior resulting from bubbling of pressurized gas into the furnace interior from the reservoir interior.

15. Stirring apparatus as claimed in claim 14, wherein the pressure detector comprises a rotameter through which a constant stream of air is passed, the air being fed to the resevoir interior whereby it is affected by pressure variations in the resevoir interior produced by bubbling.

16. Stirring apparatus as claimed in claim 15, wherein the rotameter comprises a float device in the constant stream of air whose level is disturbed by the detected pressure variations, the pressure detector including means for detecting movements of the float from an equilibrium position corresponding to a steady pressure in the resevoir interior.

17. Stirring apparatus as claimed in claim 16, wherein signals from the pressure detector are employed to shorten the period for which positive pressure is applied to the resevoir interior upon detection of bubbling by the detector.

18. Stirring apparatus for use in combination with a furnace having a furnace chamber containing molten metal and for stirring the molten metal therein, the apparatus comprising:
- a reservoir chamber separate from the furnace chamber;
- a nozzle portion which when the reservoir chamber and the furnace chamber are connected together connects the interior of the furnace and reservoir chambers for the passage of the molten metal between them through the nozzle;
- vacuum/pressure generating means connected to the reservoir chamber interior for alternatively and successively producing therein a vacuum for drawing molten metal into its interior from the furnace chamber, and a positive pressure for expelling the molten metal therefrom into the furnace chamber in the form of a stirring jet;
- wherein the reservoir is provided with a pressure detector for detecting pressure variations in the reservoir interior resulting from bubbling of pressurized gas into the furnace interior from the reservoir interior.

19. Stirring apparatus as claimed in claim 18, wherein the pressure detector comprises a rotameter through which a constant stream of air is passed, the air being fed to the resevoir interior whereby it is affected by pressure variations in the resevoir interior produced by bubbling.

20. Stirring apparatus as claimed in claim 19, wherein the rotameter comprises a float device in the constant stream of air whose level is disturbed by the detected pressure variations, the pressure detector including means for detecting movements of the float from an equilibrium position corresponding to a steady pressure in the resevoir interior.

21. Stirring apparatus as claimed in claim 20, wherein signals from the pressure detector are employed to shorten the period for which positive pressure is applied to the resevoir interior upon detection of bubbling by the detector.

22. Stirring apparatus for use in combination with a furnace having a furnace chamber containing molten metal and for stirring the molten metal therein, the apparatus comprising:
- a reservoir chamber separate from the furnace chamber;
- a nozzle portion which when the reservoir chamber and the furnace chamber are connected together connects the interior of the furnace and reservoir chambers for the passage of the molten metal between them through the nozzle;
- vacuum/pressure generating means connected to the reservoir chamber interior for alternatively and successively producing therein a vacuum for drawing molten metal into its interior from the furnace chamber, and a positive pressure for expelling the molten metal therefrom into the furnace chamber in the form of a stirring jet;
- means for detecting the upper level of the molten metal in the reservoir;
- means for measuring the periods during which molten metal is drawn into the reservoir interior and expelled therefrom; and
- means for adjusting the duration of the periods to maintain control of the upper and lower levels of the molten metal in the reservoir interior.

23. Stirring apparatus as claimed in claim 22, wherein the said adjusting means initially increase said periods until a maximum upper level and a minimum lower level are obtained; the adjusting means then decrease the said periods for a substantial period of time to achieve just less than the said upper maximum level and just more than the said lower minimum level, and the adjusting means repeat the procedure after the said substantial period of time so as to optimize the filling of the reservoir with the molten metal.

24. Stirring apparatus in combination with a furnace having a furnace chamber containing molten metal and for stirring the molten metal therein, wherein the furnace chamber is square or rectangular in plan with two parallel sides and two parallel ends connecting the parallel sides, each side and each end lying in a respective vertical plane, the apparatus comprising:
- a reservoir chamber separate from the furnace chamber;
- a nozzle portion connecting the interior of the furnace and reservoir chambers for the passage of the molten metal between them through the nozzle;
- vacuum/pressure generating means connected to the reservoir chamber interior for alternatively and successively producing therein a vacuum for drawing molten metal into its interior from the furnace chamber, and a positive pressure for expelling the molten metal therefrom into the furnace chamber in the form of a stirring jet;
- wherein the nozzle portion directs the molten metal horizontally into the furnace chamber at one side adjacent one end, or at one end adjacent one side, toward the other side at an angle between 10 and 45 degrees to the vertical plane of the said one end.

25. Stirring apparatus for use in combination with a furnace having a furnace chamber containing molten metal and for stirring the molten metal therein, the apparatus comprising:
- a reservoir chamber separate from the furnace chamber;
- a nozzle portion which when the reservoir chamber and the furnace chamber are connected together connects the interior of the furnace and reservoir chambers for the passage of the molten metal between them through the nozzle;
- vacuum/pressure generating means connected to the reservoir chamber interior for alternatively and successively producing therein a vacuum for drawing molten metal into its interior from the furnace chamber, and a positive pressure for expelling the molten metal therefrom into the furnace chamber in the form of a stirring jet;

wherein the vacuum/pressure generating means comprises an injector having its low pressure inlet connected to the resevoir interior and its high pressure inlet connected to a source of high pressure air;

the injector having a control valve at its outlet that is open to apply a vacuum to the resevoir through the low pressure inlet and that is closed to apply the high pressure air through the low pressure inlet to the resevoir interior.

26. Stirring apparatus as claimed in claim 25, wherein the pressure of the high pressure air applied to the injector high pressure inlet is increased to a higher value when the control valve is open and a vacuum is applied to the resevoir interior, and is decreased to a lower value when the control valve is closed and pressure is applied to the resevoir interior.

27. Stirring apparatus for use in combination with a furnace having a furnace chamber containing molten metal and for stirring the molten metal therein, the apparatus comprising:

a reservoir chamber separate from the furnace chamber;

a nozzle portion which when the reservoir chamber and the furnace chamber are connected together connects the interior of the furnace and reservoir chambers for the passage of the molten metal between them through the nozzle;

vacuum/pressure generating means connected to the reservoir chamber interior for alternatively and successively producing therein a vacuum for drawing molten metal into its interior from the furnace chamber, and a positive pressure for expelling the molten metal thereform into the furnace chamber in the form of a stirring jet;

wherein the vacuum/pressure generating means comprises a blower having an inlet and an outlet, and means for connecting the inlet and the outlet alternatively to the resevoir interior respectively to apply a vacuum to the resevoir interior and pressure thereto.

28. Stirring apparatus as claimed in claim 27, wherein a pipe is provided connecting the blower to the resevoir interior the volume of the pipe interior being at least equal to the volume of gas that is pumped between minimum and maximum metal levels, so that gas removed from the resevoir interior during a vacuum cycle remains in the pipe and is returned to the resevoir interior during a pressure cycle.

29. Stirring apparatus as claimed in claim 28, and including means for injecting an inert gas into the resevoir interior to displace atmospheric gas therein.

* * * * *